(12) United States Patent
Brammer et al.

(10) Patent No.: US 12,036,866 B2
(45) Date of Patent: *Jul. 16, 2024

(54) METHODS AND SYSTEMS FOR AN ELECTRIC DRIVE ARRANGEMENT

(71) Applicant: Dana Heavy Vehicle Systems Group, LLC, Maumee, OH (US)

(72) Inventors: Andrew T. Brammer, Toledo, OH (US); Michael D. Cook, Holland, OH (US)

(73) Assignee: DANA HEAVY VEHICLE SYSTEMS GROUP, LLC, Maumee, OH (US)

(*) Notice: Subject to any disclaimer, the term of this patent is extended or adjusted under 35 U.S.C. 154(b) by 175 days.

This patent is subject to a terminal disclaimer.

(21) Appl. No.: 17/448,844

(22) Filed: Sep. 24, 2021

(65) Prior Publication Data

US 2022/0009333 A1   Jan. 13, 2022

Related U.S. Application Data

(63) Continuation of application No. 16/843,709, filed on Apr. 8, 2020, now Pat. No. 11,198,356.

(Continued)

(51) Int. Cl.
*B60K 6/365* (2007.10)
*B60K 6/26* (2007.10)
(Continued)

(52) U.S. Cl.
CPC ............... *B60K 6/365* (2013.01); *B60K 6/26* (2013.01); *B60K 17/02* (2013.01); *B60K 17/12* (2013.01)

(58) Field of Classification Search
None
See application file for complete search history.

(56) References Cited

U.S. PATENT DOCUMENTS

| RE15,542 E | 2/1923 | Thiell |
|---|---|---|
| 3,314,307 A | 4/1967 | Egbert |

(Continued)

FOREIGN PATENT DOCUMENTS

| DE | 102013016441 A1 * | 4/2015 | ............... B60K 1/00 |
|---|---|---|---|
| DE | 102017212925 A1 * | 1/2019 | |

(Continued)

OTHER PUBLICATIONS

DE 102010050709 translation (Year: 2010).*

(Continued)

*Primary Examiner* — Richard W Ridley
*Assistant Examiner* — Aimee Tran Nguyen
(74) *Attorney, Agent, or Firm* — McCoy Russell LLP

(57) ABSTRACT

Various methods and systems are provided for a drive arrangement for a vehicle including a housing, a double planetary gear set partially or fully contained within the housing, an input shaft selectively engaged with the double planetary gear set, a first clutch assembly coupled to the input shaft and selectively engaged with the double planetary gear set, a second clutch assembly coupled to the input shaft and selectively engaged with the double planetary gear set, and a sliding spline coupled to the input shaft and selectively engaged with the double planetary gear set. The double planetary gear set including a first sun gear, a second sun gear, a first set of planetary gears, a second set of planetary gears, a planetary gear carrier, and a ring gear, wherein components of the double planetary gear set are lockable thereby providing three different gear ratios.

18 Claims, 7 Drawing Sheets

Related U.S. Application Data

(60) Provisional application No. 62/895,620, filed on Sep. 4, 2019, provisional application No. 62/832,472, filed on Apr. 11, 2019.

(51) Int. Cl.
  *B60K 17/02* (2006.01)
  *B60K 17/12* (2006.01)

(56) References Cited

U.S. PATENT DOCUMENTS

| | | | |
|---|---|---|---|
| 3,982,443 | A | 9/1976 | Fitch |
| 4,346,622 | A | 8/1982 | Pierce |
| 4,482,039 | A | 11/1984 | Harris |
| 4,602,522 | A * | 7/1986 | Dorpmund ............ F16H 47/085 475/56 |
| 4,811,631 | A | 3/1989 | Honig et al. |
| 4,884,472 | A | 12/1989 | Miura et al. |
| 4,984,484 | A * | 1/1991 | Fujiwara ............... F16H 61/061 477/164 |
| 5,135,444 | A | 8/1992 | Hattori |
| 5,156,575 | A * | 10/1992 | Garrett .................... F16H 57/08 475/284 |
| 5,289,890 | A * | 3/1994 | Toyoda ................... B60L 50/61 318/432 |
| 5,732,595 | A | 3/1998 | Brookins |
| 6,887,175 | B2 | 5/2005 | Yamauchi et al. |
| 6,966,890 | B2 | 11/2005 | Heitmann et al. |
| 7,278,949 | B2 | 10/2007 | Bader |
| 7,665,690 | B2 | 2/2010 | Sheahan, Jr. et al. |
| 8,007,396 | B2 * | 8/2011 | Kimes .................... F16H 3/666 475/903 |
| 8,303,456 | B2 * | 11/2012 | Kim ........................ F16H 3/666 475/329 |
| 8,591,377 | B1 * | 11/2013 | Hoffman ................ F16H 3/663 475/285 |
| 8,888,637 | B2 * | 11/2014 | Kimes ................. B60L 15/2054 475/5 |
| 9,194,471 | B2 | 11/2015 | Oguri |
| 9,239,103 | B2 | 1/2016 | Mellet et al. |
| 9,399,394 | B2 * | 7/2016 | Kaltenbach ......... B60L 15/2054 |
| 9,777,818 | B2 | 10/2017 | Valente et al. |
| 10,077,823 | B2 * | 9/2018 | Ai ............................ F16H 3/728 |
| 10,118,478 | B2 * | 11/2018 | Watanabe ............... F16H 3/725 |
| 10,253,851 | B2 * | 4/2019 | Beck ....................... B60K 6/387 |
| 10,408,309 | B2 | 9/2019 | Beck et al. |
| 10,781,889 | B2 | 9/2020 | Kim et al. |
| 11,072,230 | B2 * | 7/2021 | Dempel ................ B60W 20/30 |
| 11,125,329 | B2 * | 9/2021 | Quinn, Jr. ............... F16H 61/12 |
| 11,198,356 | B2 * | 12/2021 | Brammer ............... B60K 6/365 |
| 2006/0276293 | A1 | 12/2006 | Koyama |
| 2015/0167794 | A1 * | 6/2015 | Morio ..................... F16H 3/724 475/5 |

FOREIGN PATENT DOCUMENTS

| | | | | |
|---|---|---|---|---|
| DE | 102010050709 B4 * | 5/2019 | | ............. B60K 1/00 |
| DE | 102017010868 A1 * | 5/2019 | | |
| EP | 0752544 A2 | 1/1997 | | |

OTHER PUBLICATIONS

DE 102013016441 translation (Year: 2013).*
DE 102017010868 translation (Year: 2017).*
DE 1020177212925 translation (Year: 2017).*

* cited by examiner

METHODS AND SYSTEMS FOR AN ELECTRIC DRIVE ARRANGEMENT

CROSS REFERENCE TO RELATED APPLICATIONS

The present application is a Continuation of U.S. Non-Provisional patent application Ser. No. 16/843,709, entitled "METHODS AND SYSTEMS FOR AN ELECTRIC DRIVE ARRANGEMENT", and filed on Apr. 8, 2020. U.S. Non-Provisional application Ser. No. 16/843,709 claims priority to U.S. Provisional Patent Application No. 62/832,472, entitled "A Drive Arrangement and Shifting Method for the Drive Arrangement", and filed on Apr. 11, 2019. U.S. Non-Provisional application Ser. No. 16/843,709 also claims priority to U.S. Provisional Patent Application No. 62/895,620, entitled "A Drive Arrangement and Shifting Method for the Drive Arrangement", and filed on Sep. 4, 2019. The entire contents of the above-listed applications are incorporated herein by reference for all purposes.

FIELD

Embodiments of the subject matter disclosed herein relate to electric drive arrangements and shifting methods.

BACKGROUND

Electric motors may be used as a single or supplemental source of rotational energy to move a vehicle over the ground, thereby reducing or eliminating reliance on internal combustion engines, thus reducing or eliminating fuel costs, pollution, complexity, and other disadvantages. Heavy-duty trucks demand electric motors with high torque capacity to handle the high weight and loads these vehicles encounter. Gearboxes may be connected to these electric motors to provide a range of capabilities for the motors and the vehicles. Known gearboxes, however, typically use conventional hydraulic clutches, which take up a significant amount of space on the vehicle and demand complex hydraulics and controls to operate.

BRIEF DESCRIPTION

In one embodiment, a system comprises a drive arrangement for a vehicle including a housing, a double planetary gear set partially or fully contained within the housing, an input shaft selectively engaged with the double planetary gear set, a first clutch assembly coupled to the input shaft and selectively engaged with the double planetary gear set, a second clutch assembly coupled to the input shaft and selectively engaged with the double planetary gear set, and a sliding spline coupled to the input shaft and selectively engaged with the double planetary gear set. The double planetary gear set including a first sun gear, a second sun gear, a first set of planetary gears, a second set of planetary gears, a planetary gear carrier, and a ring gear, wherein components of the double planetary gear set are lockable thereby providing three different gear ratios. The input shaft coupled to and configured to receive torque from an electric motor.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIGS. 2-4 and 6 are shown approximately to scale, however other relative dimensions may be used.

DETAILED DESCRIPTION

Figure 1:
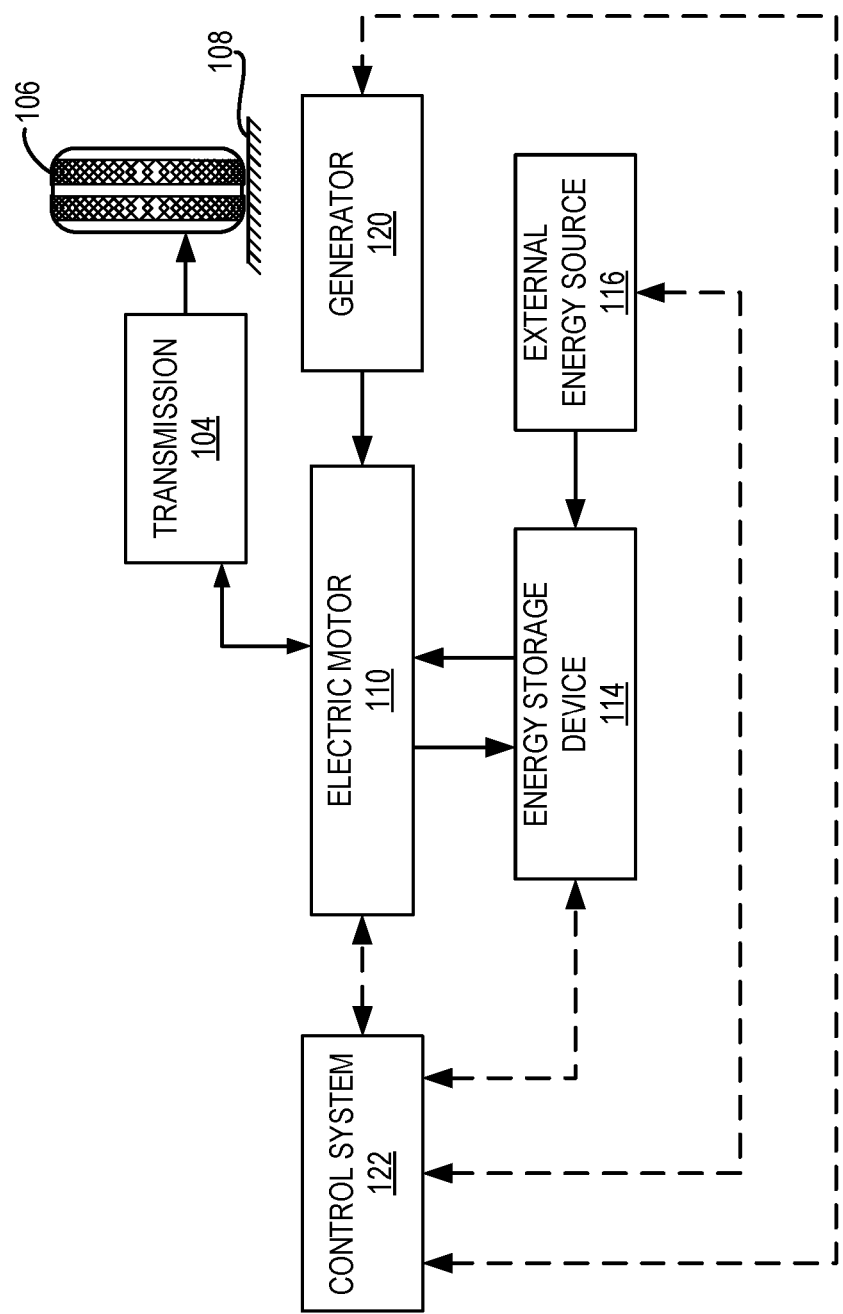
FIG. 1 schematically shows a vehicle with a hybrid propulsion system.

Electric vehicles (EVs) may employ a single gear to drive the wheels as electric motors have a wider RPM window in which the motor can operate efficiently as compared to conventional internal combustion engines, with the motors being power efficient throughout the entire range of the RPM window. As such, EVs do not demand a specific RPM range to be used during low-speed driving or under acceleration and may produce almost instantaneous torque from zero revs. Thus, a gear ratio for an electric vehicle axle assembly that contains a balance between acceleration and top speed is selected. If the gear ratio is too low, the EV may accelerate very quickly but be limited to a low top speed. Alternatively, if the gear ratio is high, the gearing may be optimal for top speeds but acceleration will be limited. As such, there is a demand for EVs that may achieve increased speeds without comprising acceleration. Further, different customer applications (e.g., racing applications, heavy-duty truck applications) may demand or benefit from an electric axle assembly having multiple gear ratios.

As such, gearboxes may be connected to electric motors thereby permitting customers to choose from more than one gear ratio during vehicle operation. For example, a first gear ratio may be selected for increased launch performance and a second gear ratio may be selected for more efficient high-speed driving. Gearboxes employed with electric motors for heavy-truck applications generally use conventional hydraulic clutches to shift between the different gear ratios. However, hydraulic clutch systems take up a significant amount of packaging space and demand complex hydraulics to operate. Consequently, achieving a high power density from an electric vehicle (EV) motor and gearbox for a range of applications, including heavy-duty truck applications, using a compact and high output power assembly is desirable.

Thus, according to the embodiments disclosed herein, a three-speed electric drive arrangement that utilizes two clutches and one sliding spline coupling to switch between different gear ratios is provided. The drive arrangement includes a gear box with a Ravigneaux or Ravigneaux-type gear set, where different portions of the Ravigneaux or Ravigneaux-type gear set are held in a stationary position during different operating conditions to generate three different gear ratios. A single synchronized clutch provides power flow from all three gear ratios along with a one-way clutch that is coupled between a housing and a carrier assembly. The sliding splined coupling is used for engagement from neutral since no synchronization is demanded when the vehicle is stopped. The synchronizer clutch and the one-way clutch both use separate electromechanical actuators. By utilizing a simple clutch assembly as typically seen on manual transmissions, the packaging space for the electric drive arrangement may be minimized while still maintaining a high torque carrying capacity. Further, the cost, weight, and complexity of the gearbox may be reduced as the use of hydraulic clutches and hydraulic actuation is eliminated.

Figure 2:
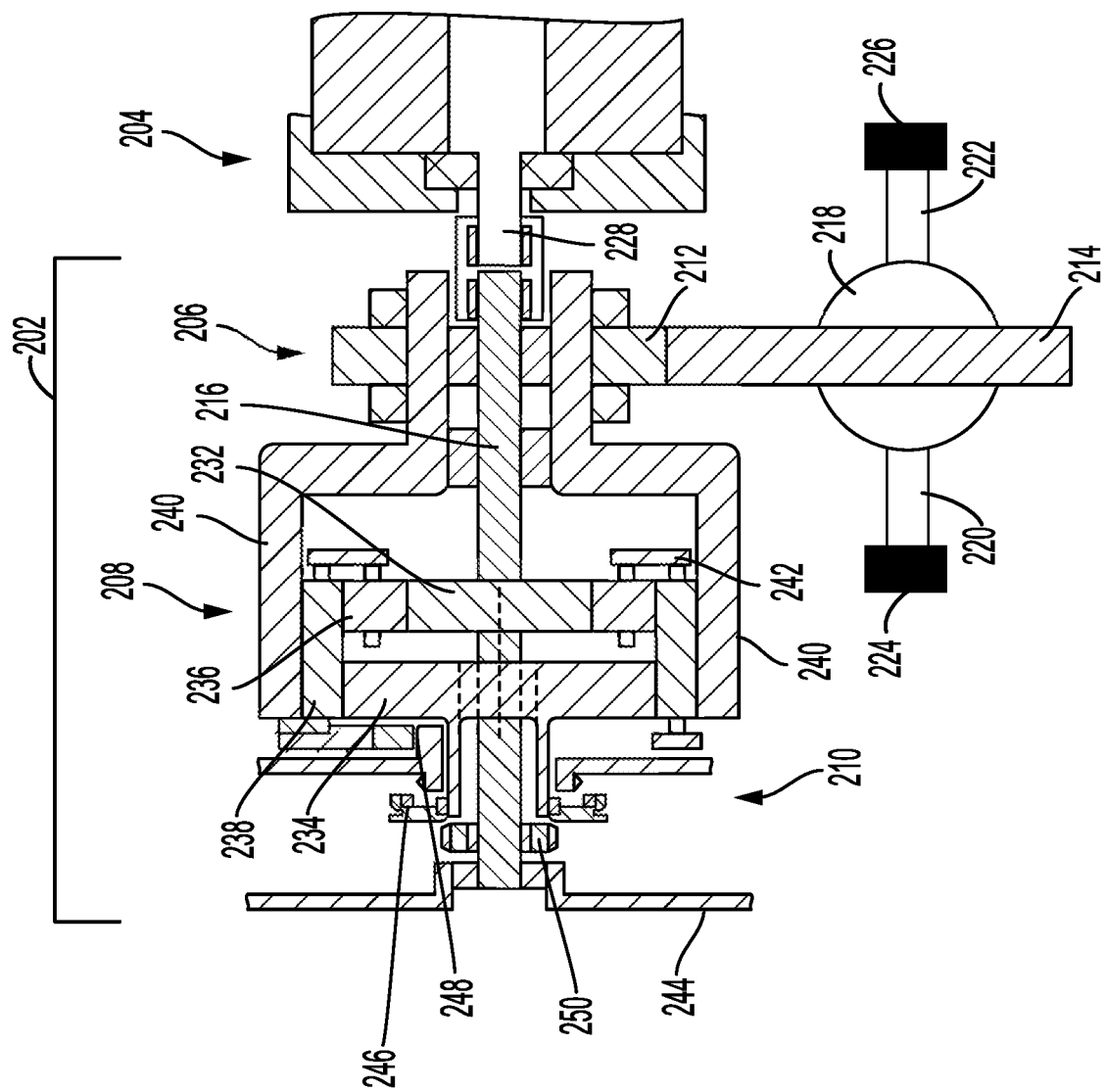
FIG. 2 is a cross-sectional side view of a portion of an electric drive arrangement in accordance with one embodiment of the present disclosure.
Figure 3:
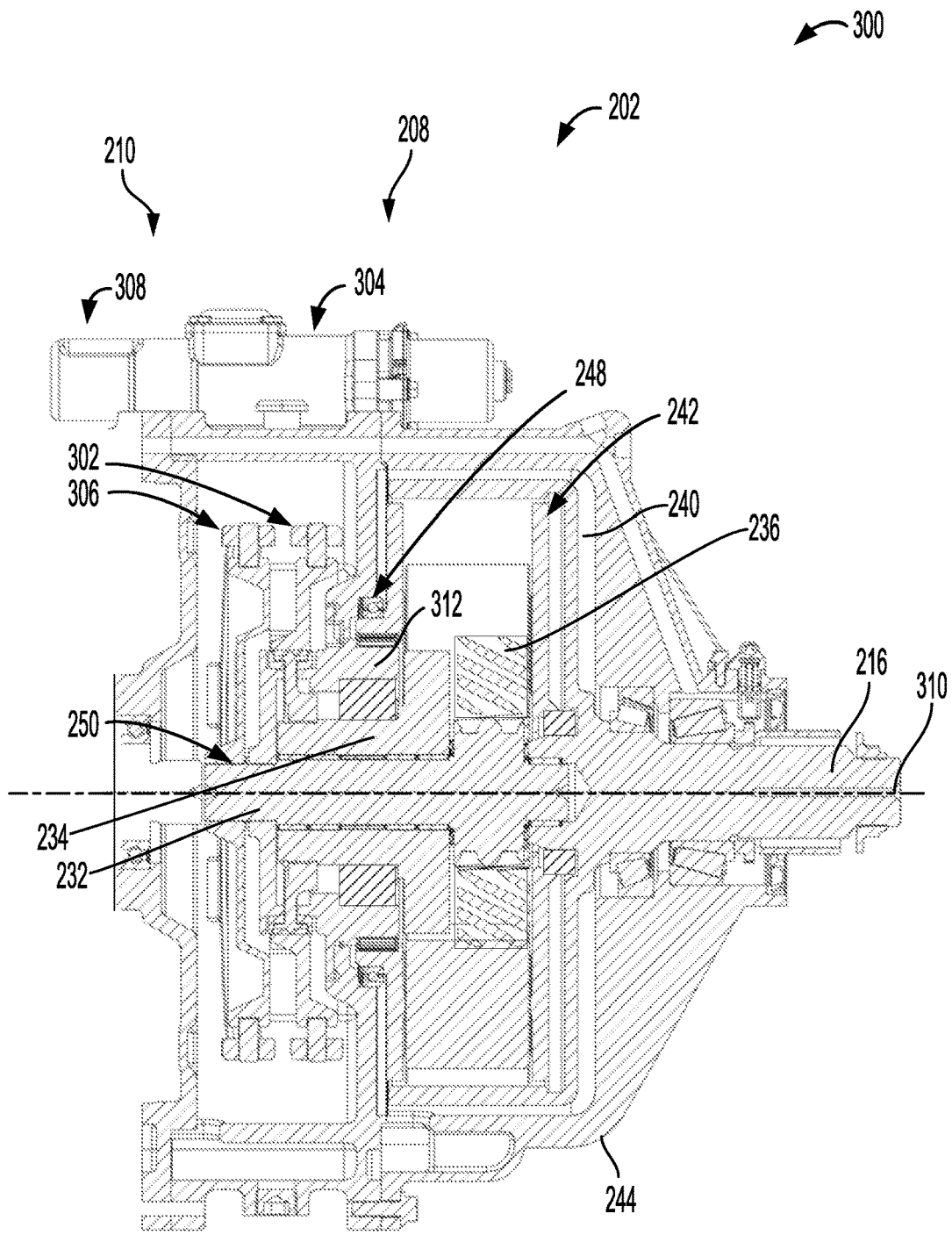
FIG. 3 is an enlarged cross-sectional side view of a gearbox of the electric drive arrangement of FIG. 2.
Figure 4:
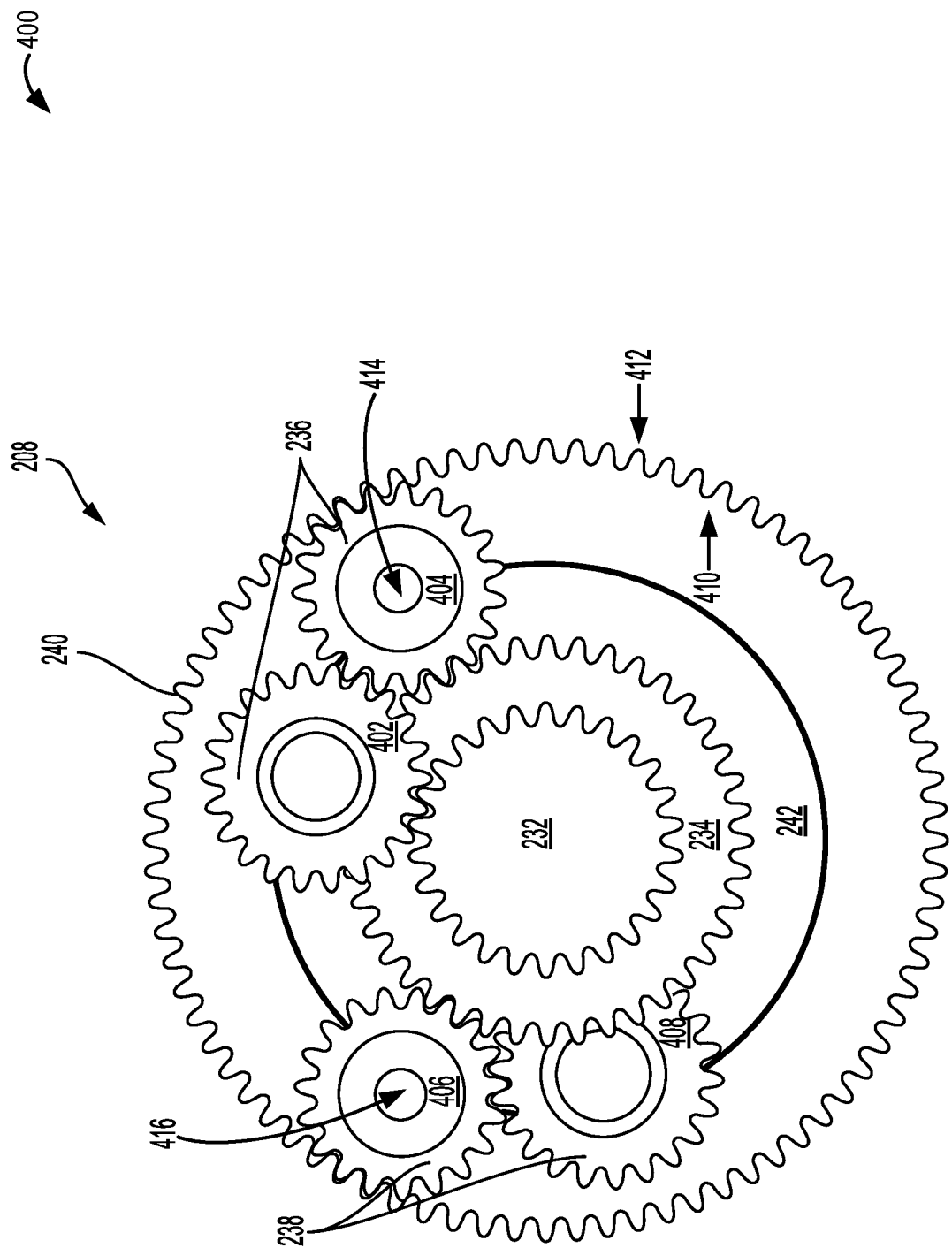
FIG. 4 is a schematic front view of the gears comprising the gearbox of the electric drive arrangement of FIG. 2.

It is within the scope of this disclosure, and as a non-limiting example, that the electric drive arrangement and the shifting method for the assembly disclosed herein may be used in automotive, off-road vehicle, all-terrain vehicle, and structural applications. As a non-limiting example, the electric drive arrangement and the shifting method for the assembly disclosed herein may also be used in passenger vehicle, EV, hybrid electric vehicle, commercial vehicle, autonomous vehicles, semi-autonomous vehicles and/or heavy vehicle applications. FIG. 1 is an example of a hybrid vehicle propulsion system that may include an embodiment of the electric drive arrangement disclosed herein. A first embodiment of the electric drive arrangement is illustrated in FIGS. 2-4 and a second embodiment of the electric drive arrangement is illustrated in FIG. 6. Methods for shifting the first and second embodiments of the electric drive arrangement are provided in FIGS. 5 and 7, respectively.

FIG. 1 illustrates an example vehicle propulsion system 100 that may include the electric drive arrangement of the present disclosure. Vehicle propulsion system 100 includes an electric motor 110. The motor 110 may be coupled to a transmission 104. The transmission 104 may be a manual transmission, automatic transmission, or combinations thereof. Further, various additional components may be included, such as a torque converter, and/or other gears such as a final drive unit, etc. Transmission 104 is shown coupled to a drive wheel 106 which is in contact with a road surface 108. Thus, the electric motor 110 may be drivingly coupled to the drive wheel 106 via transmission 104. The depicted connections between the motor 110, transmission 104, and drive wheel 106 indicate transmission of mechanical energy from one component to another, whereas the connections between the motor 110 and the energy storage device 114 may indicate the transmission of electrical energy forms. The transmission 104 may be used in hybrid vehicle implementations as well.

Vehicle propulsion system 100 may utilize a variety of different operational modes depending on operating conditions encountered by the vehicle propulsion system 100. For example, under select operating conditions, motor 110 may propel the vehicle via the drive wheel 106. During other operating conditions, motor 110 may be operated to charge an energy storage device 114 (e.g., a battery, capacitor, flywheel, pressure vessel, so on). For example, motor 110 may receive wheel torque from the drive wheel 106 where the motor 110 may convert the kinetic energy of the vehicle to electrical energy for storage at the energy storage device 114. This operation may be referred to as regenerative braking of the vehicle. Thus, motor 110 can provide a generator function in some embodiments. However, in other embodiments, a generator 120 may instead receive wheel torque from the drive wheel 106, where the generator 120 may convert the kinetic energy of the vehicle to electrical energy for storage at the energy storage device 114. In some embodiments, the energy storage device 114 may be configured to store electrical energy that may be supplied to other electrical loads residing on-board the vehicle (other than the motor 110), including cabin heating and air conditioning, engine starting, headlights, cabin audio and video systems, etc. As a non-limiting example, energy storage device 114 may include one or more batteries and/or capacitors.

A control system 122 may communicate with one or more of the motor 110, energy storage device 114, generator 160 and/or additional components of the vehicle propulsion system 100. For example, the control system 122 may receive sensory feedback information from one or more of the motor 110, energy storage device 114, and generator 120. Further, control system 122 may send control signals to one or more of the motor 110, energy storage device 114, and generator 160 responsive to this sensory feedback. Control system 122 may receive an indication of an operator requested output of the vehicle propulsion system from a vehicle operator (e.g., via a pedal position sensor communicatively coupled to an acceleration and/or brake pedal).

Energy storage device 114 may periodically receive electrical energy from an external energy source 116 residing external to the vehicle (e.g., not part of the vehicle). As a non-limiting example, the vehicle propulsion system 100 may be configured as a plug-in electric vehicle (PEV), whereby electrical energy may be supplied to the energy storage device 114 from the external energy source 116 via an electrical energy transmission cable. While the vehicle propulsion system 100 is operated to propel the vehicle, the external energy source 116 may be disconnected from the energy storage device 114. The control system 122 may identify and/or control the amount of electrical energy stored at the energy storage device, which may be referred to as the state of charge (SOC). In other embodiments, electrical energy may be received wirelessly at the energy storage device 114 from the external energy source 116. For example, energy storage device 114 may receive electrical energy from the external energy source 116 via one or more of electromagnetic induction, radio waves, and electromagnetic resonance. As such, it should be appreciated that any suitable approach may be used for recharging the energy storage device 114 from a power source that does not comprise part of the vehicle. In this way, the motor 110 may propel the vehicle by utilizing an energy source.

The vehicle propulsion system 100 may include an electric drive arrangement in accordance with the present disclosure. As such, the transmission 104 may include a planetary gear set, such as a Ravigneaux or Ravigneaux-type gear set, used to generate three different gear ratios. The transmission 104 may utilize two clutches and one sliding spline coupling to hold different portions of the gear set stationary, thereby switching between gear ratios as commanded by signals output from the control system 122 in response to user input. As such, the packaging space for the electric drive arrangement may be minimized while still maintaining a high torque carrying capacity.

FIG. 2 is a cross-sectional side view of a portion of an axle assembly 200 of a vehicle including a first embodiment of an electric drive arrangement 202. The axle assembly 200 includes a prime mover, such as an electric motor 204, connected to the drive arrangement 202. In some embodiments, the prime mover may be a power source fueled by a non-electrical energy source (e.g., a hydrocarbon, solar, and/or pneumatic energy source). The drive arrangement 202 includes a final drive assembly 206, a double planetary gear set 208, and a clutch mechanism 210. The double planetary gear set 208 and clutch mechanism 210 may be contained within a housing 244.

The drive arrangement 202 may receive power from the motor 204 via an input shaft 216 that extends through the drive arrangement 202. A motor shaft 228 may extend from the motor 204 and connect with the input shaft 216. The connection between the input shaft 216 and the motor shaft may thereby allow power to be transmitted from the motor 204 to the drive arrangement 202. The input shaft 216 may be connected to the motor shaft 228 via a coupling, splines, joints, or another suitable connection mechanism capable of transmitting torque from the motor 204 to the input shaft 216 via the motor shaft 228. Power transmitted to the input shaft 216 may then be transferred to the double planetary gear set 208 via a first sun gear 232 coupled to and surrounding the input shaft 216.

The double planetary gear set 208 includes the first sun gear 232, a second sun gear, a first set of planetary gears 236, a second set of planetary gears 238, a ring gear 240, and a planetary gear carrier 242. In some embodiments, the double planetary gear set 208 may be a Ravigneaux or Ravigneaux-type gear set. As shown in a front view 400 of the double planetary gear set 208 illustrated in FIG. 4, the first sun gear 232 that may be selectively engaged with a second sun gear 234. The second sun gear 234 may have a larger diameter and more teeth than the first sun gear 232. Each of the first and second sets of planetary gears 236, 238 may include two planetary gears. For example, the first set of planetary gears 236 includes a first inner planet gear 402 and a first outer planet gear 404. The second set of planetary gears 238 includes a second outer planet gear 406 and a second inner planet gear 408. In some embodiments, one or both of the first and second sets of planetary gears 236, 238 may have more than two gears. For example, the first set of planetary gears 236 may have three gears and the second set of planetary gears 238 may have four gears in some embodiments.

The first sun gear 232 may be directly coupled to and concentric with the first set of planetary gears 236 via interaction with the first inner planet gear 402. For example, the teeth of the first sun gear 232 may be in meshing engagement with teeth of the first inner planet gear 402. Similarly, the second sun gear 234 may be directly coupled to and concentric with the second set of planetary gears 238 via interaction with the second outer planet gear 406. Additionally, the first set of planetary gears 236 may be indirectly coupled to the second set of planetary gears 238 via the coupled interaction between the first outer planet gear 404 and the second outer planet gear 406 with the ring gear 240. For example, teeth of the first outer planet gear 404 and the second outer planet gear 406 may be in meshed engagement with inner teeth 410 of the ring gear 240. Further, outer teeth 412 of the ring gear 240 may be in meshed engagement with teeth of a pinion gear 212 comprising the final drive assembly 206, as further described below. In some embodiments, the ring gear 240 may engage with more than one gear of each of the first and second sets of planetary gears 236, 238.

The ring gear 240 may radially surround the first sun gear 232, the second sun gear 234, first set of planetary gears 236, the second set of planetary gears 238, and the planetary gear carrier 242. The planetary gear carrier 242 may be rotatably coupled and provide support to one or more gears of the first set of planetary gears 236 and one or more gears the second set of planetary gears 238. For example, the planetary gear carrier 242 may connect to a central aperture 414 of the first inner planet gear 402 and a central aperture 416 the second inner planet gear 408. Thus, the first set of planetary gears 236 and the second set of planetary gears 238 may rotate around the first and second sun gears 232, 234 using torque provided to the double planetary gear set 208 via the input shaft 216. The torque may then be transferred from the first set of planetary gears 236 and/or the second set of planetary gears 238 to the ring gear 240 where it is subsequently transferred to the final drive assembly 206.

Returning now to FIG. 2, the final drive assembly 206 may be located between the motor 204 and the double planetary gear set 208. The final drive assembly 206 may be comprised of a pinion gear 212 drivingly engaged with a ring gear 214. The pinion gear 212 of the final drive assembly 206 may be coupled with the ring gear 240 of the double planetary gear set 208. Thus, torque transferred from the motor 202 to the input shaft 216 may be transmitted through the double planetary gear set 208 (e.g., via input shaft 216 connection to first sun gear 232) and from the ring gear 240 of the double planetary gear set 208 to the pinion gear 212 of the final drive assembly 206.

The pinion gear 212 may then transfer torque to the ring gear 214. The ring gear 214 is further coupled to a differential 218. The differential 218 may be drivingly connected to a first half axle 220 and a second half axle 222 extending therefrom. The first half axle 220 may be connected to a first wheel 224 and the second half axle 222 may be connected to a second wheel 226. Thus, the configuration of the final drive assembly 206 may change the direction of and transmit torque power from the drive arrangement 202 to the differential 218. The differential 218 may then distribute torque to the first half axle 220 and the second half axle 222 causing each of the first and second wheels 224, 226 to rotate thereby propelling the vehicle.

Thus, by selectively engaging different portions of the double planetary gear set 208, the vehicle may operate at three individual gear ratios. The three gear ratios may be advantageously used to increase vehicle mid-speed performance, where many vehicles routinely spend a significant amount of time. Further, the three gear ratios may increase overall efficiency as the motor and driveline may be maintained in a peak efficiency zone. The different portions of the double planetary gear set 208 may be selectively engaged using the clutch mechanism 210. The clutch mechanism 210 may be communicatively coupled to a control system (e.g., control system 122 of FIG. 1). The clutch mechanism 210 may include a first clutch assembly 246, a second clutch assembly 248, and a sliding spline 250. In response to user input, the control system may send a signal causing one or more of the clutches comprising the clutch mechanism 210 to selectively engage a portion of the double planetary gear set 208, as further described below.

FIG. 3 is an enlarged cross-sectional side view of the drive arrangement 202 showing the clutch mechanism 210 in further detail. The first clutch assembly 246 is disposed proximate to the second sun gear 234, the second clutch assembly 248 is selectively coupled with the planetary gear carrier 242, and the sliding spline 250 is disposed proximate to and coupled with the first sun gear 232. In some embodiments, the first clutch assembly 246 may be interposed between the double planetary gear set 208 and the sliding spline 250 on the drive arrangement 202.

The first clutch assembly 246 includes a first shift fork 302 and a first actuator 304. In a preferred embodiment, the first clutch assembly 246 may be a synchronizer clutch. In some embodiments, the first clutch assembly 246 may be a wet clutch, dry clutch, dog clutch, or electromagnetic clutch. In some embodiments, the first actuator 304 may be an electric actuator, linear actuator, pneumatic actuator, hydraulic actuator, electro-mechanical actuator, and/or electromagnetic actuator. In response to user input, the first shift fork 302 and the first actuator 304 may engage the first clutch assembly 246 to couple the second sun gear 234 to the housing 244 thereby preventing rotation of the second sun gear 234.

The second clutch assembly 248 may be a conventional clutch or a selectable one-way clutch. The second clutch assembly 248 may be coupled to the housing 244 and the planetary gear carrier 242. In response to user input, the second clutch assembly 248 may couple the planetary gear carrier 242 to a portion of the housing 244, such as a grounded case component 312, thereby preventing rotation of the planetary gear carrier 242. In some embodiments, the second clutch assembly 248 is interposed between the first clutch assembly 246 and the double planetary gear set 208 on the drive arrangement 202.

The sliding spline 250 includes a second shift fork 306 and a second actuator 308. In some embodiments, the second actuator 308 may be an electric actuator, linear actuator, pneumatic actuator, hydraulic actuator, electro-mechanical actuator, and/or electro-magnetic actuator. In some embodiments, the sliding spline 250 may be a sliding non-synchronized clutch or a neutral clutch. The second actuator 308 may be operably configured to allow the second shift fork 306 to induce axial movement of the sliding spline 250 along an axis 310 of the drive arrangement 202. Thus, in response to user input, the sliding spline 250 may move along the axis 310 thereby selectively engaging either the first sun gear 232 and/or the second sun gear 234.

Figure 5:
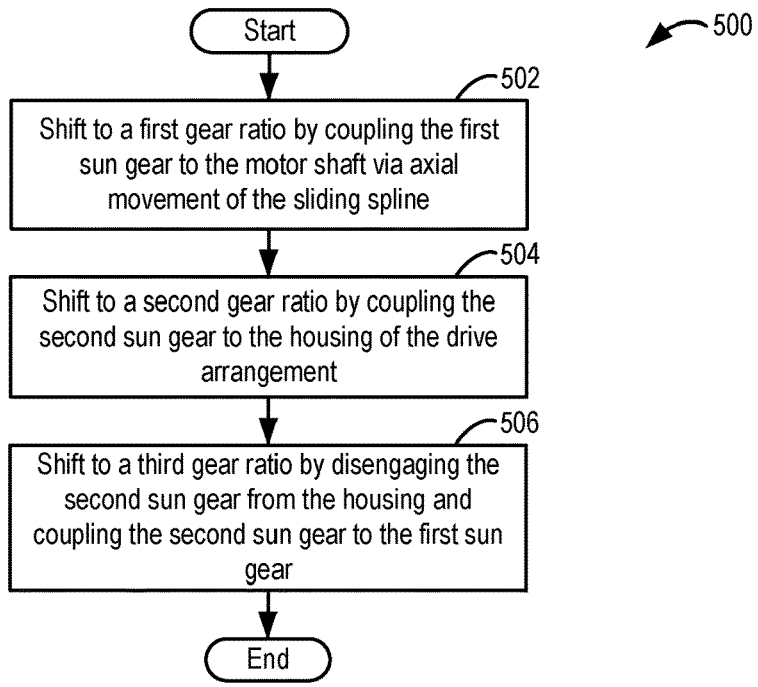
FIG. 5 is a method for shifting the electric drive arrangement of FIGS. 2-4.
Figure 6:
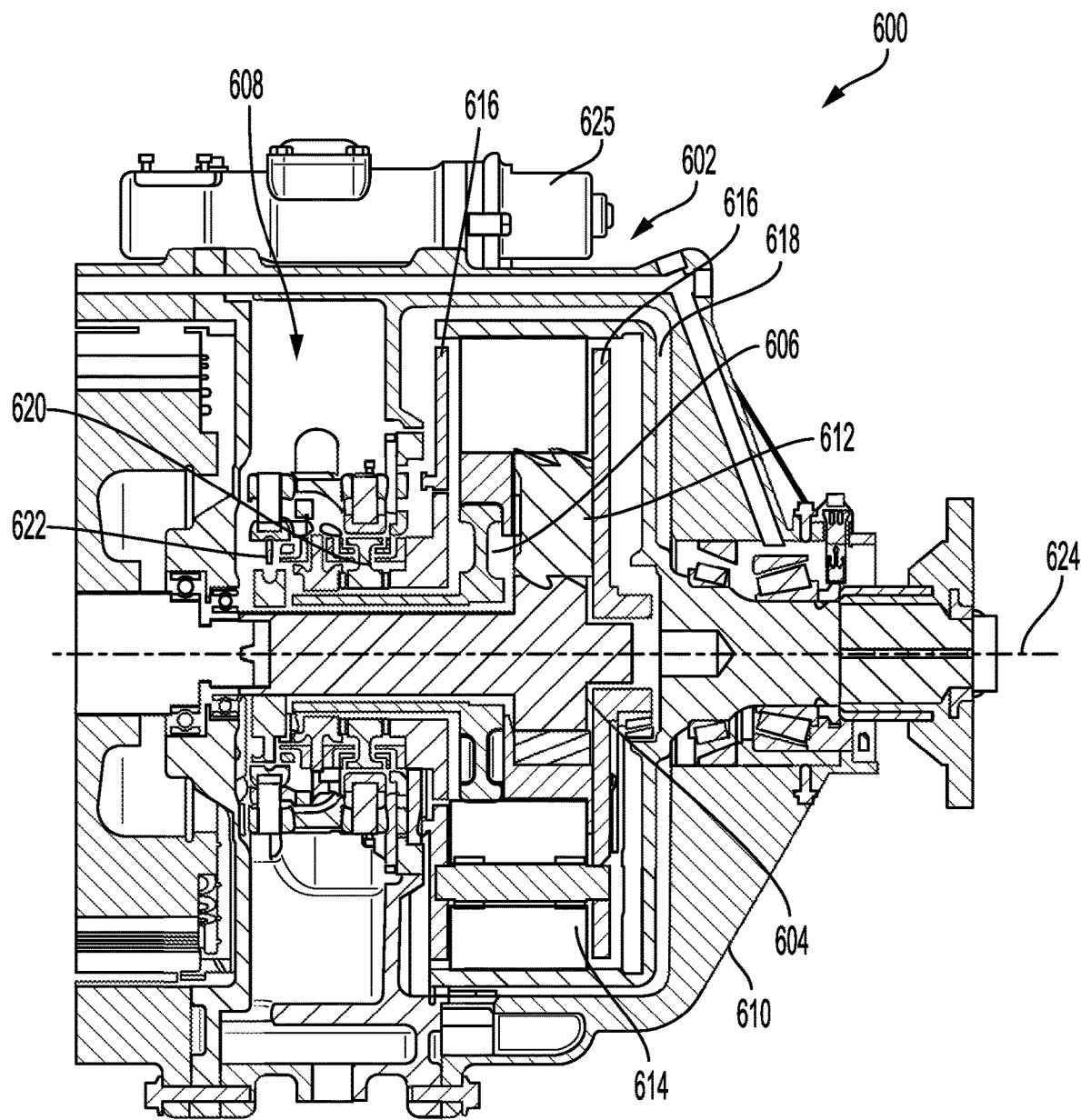
FIG. 6 is a cross-sectional side view of a portion of an electric drive arrangement in accordance with a second embodiment of the present disclosure.

FIG. 5 is a flowchart illustrating a method 500 for shifting the drive arrangement 202 illustrated in FIGS. 2-4. Method 500 is described with respect to the system and components described above with respect to FIGS. 1-4 but could also be carried out with other systems/components (e.g., an electric motor of an electric heavy-duty truck, electric motors of machines) without departing from the scope of this disclosure. Method 500 may be carried out according to instructions stored in non-transitory memory of a computing device such as a control system (e.g., control system 122 of FIG. 1) of a vehicle. The control system may include a central processing unit (CPU) to execute the instructions stored in the memory.

At 502, method 500 may include shifting to a first gear ratio by coupling the first sun gear 234 to the motor shaft 228 via axial movement of the sliding spline 250. The sliding spline 250 may be coupled to the first sun gear 232 via a spline connection. During non-operation of the vehicle, the sliding spline 250 is splined to the first sun gear 232 only. Thus, no torque is transmitted through the double planetary gear set 208 even if the motor shaft 228 is allowed to rotate. During operation, the sliding spline 250 is moved axially along the axis 310 (e.g., away from a neutral clutch position) of the drive arrangement 202 via the second shift fork 306 and the second actuator 308. The axial movement causes the sliding spline 250 to be coupled between the first sun gear 232 and the input shaft 216, thereby rotatably coupling the first sun gear 232 to the input shaft 216. Thus, the first sun gear 232 may be indirectly coupled to and receive torque transferred from the motor shaft 228 via the sliding spline 250. The sliding spline 250 being additionally coupled to the input shaft 216, with the input shaft 216 coupled to and receiving torque from the motor shaft 228.

The coupling of the first sun gear 232 to the motor shaft 228 may result in the first gear ratio in the forward direction. As the first sun gear 232 is coupled to the motor shaft 228, the planetary gear carrier 242 may be coupled to a portion of the housing 244 via the second clutch assembly 248 thereby preventing movement of the planetary gear carrier 242. Thus, in the first gear ratio, torque is transmitted from the first sun gear 232 to the first and second sets of planetary gears 236, 238, from the first and second sets of planetary gears 236, 238 to the ring gear 240, from the ring gear 240 to the final drive assembly 206, and from the final drive assembly 206 to the first and second wheels 224, 226.

Once operating at the first gear ratio, the vehicle may shift to a second gear ratio in the forward direction by coupling the second sun gear 234 to a portion of the housing 244 of the drive arrangement 202 at 504. The second sun gear 234 may be coupled to a portion of the housing 244, such as the grounded case component 312, to prevent rotation of the second sun gear 234. In some embodiments, the first shift fork 302 and the first actuator 304 may engage the first clutch assembly 246 to couple the second sun gear 234 to the housing 244. In some embodiments, the first shift fork 302 and the first actuator 304 may engage the sliding spline 250 to couple the second sun gear 234 to the housing 244. Thus, in the second gear ratio, torque is transmitted from the first sun gear 232 to the first set of planetary gears 236, from the first set of planetary gears 236 to the planetary gear carrier 242, from the planetary gear carrier 242 to the ring gear 240, from the ring gear 240 to the final drive assembly 206, and from the final drive assembly 206 to the first and second wheels 224, 226.

Once operating in the second gear ratio, the vehicle may shift to a third gear ratio in the forward direction at 506 by disengaging the second sun gear 234 from the housing 244 and coupling the second sun gear 234 to the first sun gear 232. In some embodiments, the first shift fork 302 and the first actuator 304 may engage the sliding spline 250 to disengage the second sun gear 234 from a portion of the housing 244 and couple the second sun gear 234 with the first sun gear 232. In some embodiments, the first shift fork 302 and the first actuator 304 may engage the first clutch assembly 246 to disengage the second sun gear 234 from a portion of the housing 244 and couple the second sun gear 234 with the first sun gear 232. As a result of the coupling of the second sun gear 234 with the first sun gear 232, the entire double planetary gear set 208 may rotate together thus providing the third gear ratio of 1:1. In some embodiments, the rotation of the motor 228 may be reversed to generate each of the first gear ratio, the second gear ratio, and the third gear ratio in the reverse direction for the drive arrangement 202.

The decision to shift gears using method 500 may depend on several factors. For example, the most basic shift control may be based on a vehicle speed which allows a smooth torque transition from one gear ratio to the next. More advanced shift controls may include logic based transitions based on vehicle speed, throttle position, brake position, and/or look ahead predictive technologies. Under some driving conditions, it may be possible to shift directly from first to third or vice versa. Typically shifting to third from first (and vice versa) would only be done at very low loads and accelerations in order to keep the gear transition smooth and to enable operation in a peak efficiency zone.

FIG. 6 is a cross-sectional side view of a portion of a second embodiment of an electric drive arrangement 600 in accordance with the present disclosure. The drive arrangement 600 comprises a clutch mechanism 608 and a double planetary gear set 602 contained within a housing 610. The double planetary gear set 602 includes a first sun gear 604, a second sun gear 606, a first set of planetary gears 612, a second set of planetary gears 614, a planetary gear carrier 616, and a ring gear 618. In some embodiments, the double planetary gear set 602 may be a Ravigneaux gear set or a Ravigneaux-type gear set.

The first sun gear 604 may be selectively engaged to the second sun gear 606. The second sun gear 606 may have a larger diameter and more teeth than the first sun gear 604. The first sun gear 604 may be directly coupled to and concentric with the first set of planetary gears 612. The first sun gear 604 may be interposed between the first set of planetary gears 612 and the second set of planetary gears 614. The first set of planetary gears 612 may be coupled to the second set of planetary gears 614. The ring gear 618 may radially surround the first sun gear 604, the second sun gear 606, first set of planetary gears 612, the second set of planetary gears 614, and the planetary gear carrier 616. The planetary gear carrier 616 may be rotatably coupled and provide support to one or more gears of the first set of planetary gears 612 and one or more gears the second set of planetary gears 614.

The clutch mechanism 608 of the electric drive arrangement 600 includes a first clutch assembly 620 and a second clutch assembly 622 but lacks a sliding spline (e.g., as compared to the electric drive arrangement 202). The first clutch assembly 620 is disposed proximate to the second sun gear 606 and selectively coupled to the planetary gear carrier 616. The first clutch assembly 620 is also interposed between the second clutch assembly 622 and the second sun gear 606. In some embodiments, each of the first clutch assembly 620 and the second clutch assembly 622 may be synchronizer clutches. In some embodiments, the first clutch assembly 620 and the second clutch assembly 622 may be a wet clutch, dry clutch, dog clutch, or an electromagnetic clutch.

In response to an actuator, the first clutch assembly 620 may move from a starting position along an axis 624 of the electric drive arrangement 600 toward the planetary gear carrier 616. The axial movement of the first clutch assembly 620 may result in the planetary gear carrier 616 being coupled to the housing 610, thereby preventing rotation of the planetary gear carrier 616. Further, axial movement of the first clutch assembly 620 away from the planetary gear carrier 616 (e.g., to a point between the starting position and the planetary gear carrier 616) may result in the planetary gear carrier 616 being uncoupled from the housing 610 and the second sun gear 606 being coupled to the housing 610. Thus, the planetary gear carrier 616 may freely rotate and the second sun gear 606 may be locked in a stationary position. Axial movement of the first clutch assembly 620 back to the starting position and axial movement the second clutch assembly 622 along the axis 624 toward the planetary gear carrier 616 may result in the second sun gear 606 being rotatably coupled to the first sun gear 604.

Thus, as compared to the first embodiment of the electric drive arrangement 202, in the drive arrangement 600, a first clutch is responsible for the first and second gear ratios and a second clutch is responsible for the third gear ratio. To achieve a first forward gear ratio, the actuator mechanism and shift fork translates the sliding splined clutch sleeve towards the carrier assembly to couple the carrier assembly to ground. To achieve a second forward ratio, that same mechanism moves the same splined clutch back through its neutral position and then even further to then couple the second large sun gear to ground. To achieve a third forward gear ratio the first splined clutch sleeve is moved by the actuator and fork mechanism back to its central and neutral position. A second actuator mechanism and shift fork assembly then moves a second sliding splined clutch sleeve from its neutral center position in the direction of the gearbox therefore coupling the small sun and large sun together.

Figure 7:
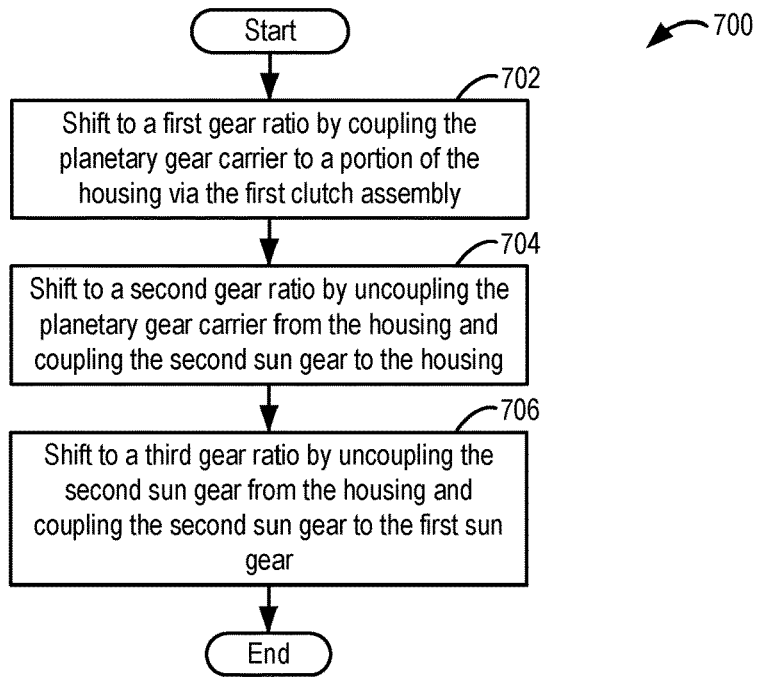
FIG. 7 is method for shifting the electric drive arrangement of FIG. 6.

FIG. 7 is a flowchart illustrating a method 700 for shifting the drive arrangement 600 illustrated in FIG. 6. Method 700 is described with respect to the system and components described above with respect to FIGS. 1-4 and 6 but could also be carried out with other systems/components (e.g., an electric motor of an electric heavy-duty truck, electric motors of machines) without departing from the scope of this disclosure. Method 700 may be carried out according to instructions stored in non-transitory memory of a computing device such as a control system (e.g., control system 122 of FIG. 1) of a vehicle.

At 702, method 700 may include shifting to a first gear ratio by coupling the planetary gear carrier 616 to a portion of the housing 610 via the first clutch assembly 620. In response to the actuator 625, the first clutch assembly 620 may move along the axis 624 of the drive arrangement 600 away from a starting position toward the planetary gear carrier 616. For example, an electro-mechanical actuator may be used. Actuator movement may be determined by an electronic control unit causing an electric motor to rotate a screw drive which is coupled to a cam and lever mechanism. The axial movement is converted to rotational movement of a shift fork shaft. This rotation allows the fork to pivot and creates an axial displacement at a fork pad which is coupled to the sliding splined clutch sleeve. The axial movement of the first clutch assembly 620 may couple the planetary gear carrier 616 to a portion of the housing 610 thereby preventing the planetary gear carrier 616 from rotating. When the planetary gear carrier 616 is held in a stationary position, the first gear ratio in the forward direction is formed. The coupling of the planetary gear carrier 616 to a portion of the housing 610 results in the formation of the first gear ratio in the forward direction. Thus, in the first gear ratio, torque may be transmitted from a motor (e.g., motor 204 of FIG. 2) to an input shaft (e.g., input shaft 216 of FIG. 2), from the input shaft to the first sun gear 604, from the first sun gear 604 to the first and second sets of planetary gears 612, 614, from the first and second sets of planetary gears 612, 614 to the ring gear 618, and from the ring gear 618 to a final drive assembly (e.g., final drive assembly 206 of FIG. 2) where the torque may be further transferred to wheels of the vehicle thereby propelling the vehicle.

Once operating at the first gear ratio, at 704, the vehicle may shift to a second gear ratio by uncoupling the planetary gear carrier 616 from the housing 610 and coupling the second sun gear 606 to the housing 610. The planetary gear carrier 616 may be uncoupled by axial movement of the first clutch assembly 620 away from the planetary gear carrier 616 in response to an actuator. The first clutch assembly 620 may move back toward but not to the starting position, thereby uncoupling the planetary gear carrier 616 from the housing 610 as well as causing the second sun gear 606 to be engaged with and fixed to a portion of the housing 610. The engagement of the second sun gear 606 with the portion of the housing 610 results in the formation of the second gear ratio in the forward direction. Thus, in the second gear ratio, torque may be transferred from the motor to the input shaft, from the input shaft to the first sun gear 604, from the first sun gear to the first set of planetary gears 612, from the first set of planetary gears 612 to the planetary gear carrier 616, from the planetary gear carrier 616 to the ring gear 610, and from the ring gear 610 to the final drive assembly where the torque may be further transferred to wheels of the vehicle thereby propelling the vehicle.

Once operating at the second gear ratio, at 706, the vehicle may shift to a third gear ratio by uncoupling the second sun gear 606 from the housing 610 and coupling the second sun gear 606 to the first sun gear 604. In response to an actuator, the first clutch assembly 620 is moved back to the starting position and the second clutch assembly 622 is moved along the axis 624 toward the planetary gear carrier 616, thereby causing the coupling of second sun gear 606 with the first sun gear 604. The coupling of the second sun gear 606 with the first sun gear 604 results in the formation of the third gear ratio in the forward direction. Thus, torque may be transferred from the motor to the input shaft, from the input shaft to the entire double planetary gear set 602, and from the ring gear 610 of the double planetary gear set 602 to the final drive assembly where the torque may be further transferred to wheels of the vehicle thereby propelling the vehicle. In some embodiments, the rotation of the motor may be reversed to generate each of the first gear ratio, the second gear ratio, and the third gear ratio in the reverse direction for the drive arrangement 600.

The decision to shift gears using method 700 may depend on several factors. For example, the most basic shift control may be based on a vehicle speed which allows a smooth torque transition from one gear ratio to the next. More advanced shift controls may include logic based transitions based on vehicle speed, throttle position, brake position, and/or look ahead predictive technologies. Under some driving conditions, it may be possible to shift directly from first to third or vice versa. Typically shifting to third from first (and vice versa) would only be done at very low loads and accelerations in order to keep the gear transition smooth and to enable operation in a peak efficiency zone.

Each of the drive arrangements 202, 600 disclosed herein are operably configured to provide a level of shift synchronization using the motor. Due to the fast response time of the motor, the motor may create positive and/or negative torque to reduce the load on each of the double planetary gear sets 208, 602 during shifting events. Thus, the demand for the use of hydraulic clutches for shifting between the three gear ratios is eliminated thereby reducing the cost, weight, and complexity of the gearboxes of the drive arrangements 202, 600.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims. In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

In a first embodiment, a drive arrangement has a double planetary gear set including a first sun gear; a second sun gear, wherein the second sun gear has a larger diameter than the diameter of the first sun gear; a first set of planetary gears, wherein the first set of planetary gears is coupled with the first sun gear; a second set of planetary gears, wherein the second set of planetary gears is coupled to the second sun gear and to the first set of planetary gears; and a ring gear radially surrounding the first set of planetary gears and the second set of planetary gears. The drive arrangement further includes a first clutch assembly disposed proximate to the second sun gear, wherein the first clutch assembly includes a shift fork and an actuator; a second clutch assembly; and a sliding spline disposed proximate to the first sun gear.

In a second embodiment, a drive arrangement has a double planetary gear set including a first sun gear; a second sun gear, wherein the second sun gear has a larger diameter than the diameter of the first sun gear; a first set of planetary gears, wherein the first set of planetary gears is coupled with the first sun gear; a second set of planetary gears, wherein the second set of planetary gears is coupled to the first set of planetary gears; and a ring gear radially surrounding the first set of planetary gears and the second set of planetary gears. The drive arrangement further includes a first clutch assembly disposed proximate to the second sun gear; and a second clutch assembly disposed proximate to the first clutch assembly, wherein the first clutch assembly is interposed between the second clutch assembly and the second sun gear. The first sun gear may be attached to an electric motor.

In some embodiments, the double planetary gear set of the drive arrangement may be a Ravigneaux gear set or a Ravigneaux-type gear set. In some embodiments, the first sun gear of the double planetary gear set of the drive arrangement may be coupled to an electric motor.

In the first embodiment, a method for shifting the drive arrangement may include coupling the first sun gear to a motor shaft by axially moving the sliding spline; coupling the second sun gear to a portion of a housing on the planetary gear set; and coupling the second sun gear with the first sun gear such that the entire double planetary gear set rotates together.

In the second embodiment, a method for shifting the drive arrangement includes coupling the planetary gear carrier to a portion of the housing via a first clutch assembly; coupling the second sun gear to a portion of a housing by shifting the first clutch assembly; and coupling the second sun gear with the first sun gear by shifting the first clutch assembly and a second clutch assembly such that the entire double planetary gear set rotates together.

In some embodiments, a shifting method for the drive arrangement described herein results in the formation of three gear ratios in the forward direction. In some embodiments, three gear ratios for the drive arrangement may be obtained in the reverse direction by reversing the rotation of an electric motor.

FIGS. 2-4 and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, the drive arrangement described herein provides three gear ratios that may be advantageously utilized by a user of an electric or hybrid vehicle. Further, as a single manual transmission style shift synchronizer may be used for shifting between all three gear ratios. Thus, the cost, weight, and complexity of the gearbox of the drive arrangement may be reduced and an alternative to the current demand of hydraulic clutches for shifting between the gear ratios of an electrically powered vehicle is provided.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An electric drive system in an electric vehicle (EV), comprising:
    a double planetary gear set;
    an input shaft selectively engaged with the double planetary gear set and configured to receive torque from an electric motor;
    a first clutch configured to selectively ground a second sun gear in the double planetary gear set;
    a second clutch configured to selectively ground a carrier in the double planetary gear set; and
    a sliding spline configured to selectively engage and disengage a first sun gear in the double planetary gear set with the input shaft;
    wherein the electric motor is designed rotate in a first direction to operate the electric drive system in a forward direction;
    wherein the electric motor is designed to rotate in a second direction which is opposite the first direction to operate the electric drive system in a reverse direction;
    wherein the first clutch and the second clutch are configured to shift between at least three discrete gear ratios; and
    wherein the second clutch is interposed by the first clutch and the double planetary gear set.

2. The electric drive system of claim 1, wherein the first clutch is configured to selectively engage and couple the second sun gear in the double planetary gear set to a housing.

3. The electric drive system of claim 1, wherein the second clutch is configured to selectively engage and couple the carrier in the double planetary gear set to the housing.

4. The electric drive system of claim 1, wherein the second clutch is a one-way clutch.

5. The electric drive system of claim 1, wherein the first and second clutches are positioned adjacent to one another.

6. The electric drive system of claim 1, wherein a rotational axis of the electric motor is parallel to a rotational axis of a differential which is coupled to a final drive assembly that is coupled to the double planetary gear set.

7. The electric drive system of claim 1, further comprising a shift fork configured to engage and disengage the first clutch.

8. The electric drive system of claim 1, wherein the sliding spline is configured to disengage the input shaft when the electric drive system is stopped.

9. The electric drive system of claim 1, further comprising a final drive assembly that is directly coupled to a differential which is coupled to a ring gear in the double planetary gear set.

10. The electric drive system of claim 1, wherein the double planetary gear set includes a first sun gear, a second sun gear, a first set of planetary gears, a second set of planetary gears, a carrier, and a ring gear.

11. An electric axle assembly, comprising:
    an electric motor;
    an input shaft rotationally coupled to the electric motor and selectively rotationally coupled to a double planetary gear set;
    a first clutch and a second clutch configured to shift the double planetary gear set between at least three discrete gear ratios;
    a final drive unit directly coupled to:
        a first gear in the double planetary gear set; and
        a differential; and
    a sliding spline configured to selectively engage and disengage a first sun gear in the double planetary gear set with the input shaft;
    wherein the electric axle assembly does not include an internal combustion engine; and
    wherein the first and second clutches are positioned adjacent to one another.

12. The electric axle assembly of claim 11, wherein the first clutch is a synchronizer clutch that is configured to selectively mechanically ground a second gear in the double planetary gear set to a housing.

13. The electric axle assembly of claim 12, wherein the second clutch is configured to selectively rotatably couple two gears to one another or mechanically ground a third gear in the double planetary gear set to the housing.

14. The electric axle assembly of claim 11, wherein the second clutch is configured to selectively mechanically ground a carrier in the double planetary gear set to a housing.

15. The electric axle assembly of claim 14, wherein the second clutch is a selectable one-way clutch.

16. The electric axle assembly of claim 11, further comprising a first shift fork configured to engage and disengage the first clutch.

17. The electric axle assembly of claim 16, further comprising a second shift fork configured to engage and disengage the second clutch.

18. The electric axle assembly of claim 11, wherein the double planetary gear set is a Ravigneaux-type gear set that includes the first sun gear, a second sun gear, a first set of planetary gears, a second set of planetary gears, a planetary gear carrier, and a ring gear.

\* \* \* \* \*